(12) United States Patent
Laine et al.

(10) Patent No.: US 12,330,653 B2
(45) Date of Patent: Jun. 17, 2025

(54) METHOD FOR VALIDATING A MODEL ASSOCIATED WITH VEHICLE DYNAMICS

(71) Applicant: VOLVO TRUCK CORPORATION, Gothenburg (SE)

(72) Inventors: Leo Laine, Härryda (SE); Emil Klintberg, Torslanda (SE); Peter Nilsson, Hovås (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/596,295

(22) PCT Filed: Jun. 14, 2019

(86) PCT No.: PCT/EP2019/065739
§ 371 (c)(1),
(2) Date: Dec. 7, 2021

(87) PCT Pub. No.: WO2020/249239
PCT Pub. Date: Dec. 17, 2020

(65) Prior Publication Data
US 2022/0306117 A1 Sep. 29, 2022

(51) Int. Cl.
*B60W 30/18* (2012.01)
*B60T 8/172* (2006.01)
(Continued)

(52) U.S. Cl.
CPC ..... *B60W 30/18172* (2013.01); *B60T 8/1725* (2013.01); *B60T 8/17551* (2013.01);
(Continued)

(58) Field of Classification Search
CPC ....... B60W 30/18172; B60W 2552/40; B60W 2520/263; B60W 2520/266; B60T 8/1725; B60T 8/17551
See application file for complete search history.

(56) References Cited

U.S. PATENT DOCUMENTS

| 10,384,672 B1 * | 8/2019 | Katzourakis | .......... B60W 10/22 |
| 2009/0069993 A1 * | 3/2009 | Inoue | .................... B60W 40/06 |
| | | | 701/70 |

(Continued)

FOREIGN PATENT DOCUMENTS

| CN | 104812612 A | 7/2015 |
| DE | 102007034143 A1 | 1/2009 |

(Continued)

OTHER PUBLICATIONS

International Search Report and Written Opinion dated Feb. 19, 2020 in corresponding International PCT Application No. PCT/EP2019/065739, 10 pages.

(Continued)

*Primary Examiner* — Jelani A Smith
*Assistant Examiner* — Toya Pettiegrew
(74) *Attorney, Agent, or Firm* — Venable LLP; Jeffri A. Kaminski

(57) ABSTRACT

A method for validating a model of vehicle dynamics for use in autonomous driving. The method comprising setting a wheel slip limit on an operation of at least one vehicle torque device, obtaining a model of vehicle dynamics based on the set wheel slip limit, and validating the model of vehicle dynamics based on the set wheel slip limit.

17 Claims, 5 Drawing Sheets

(51) Int. Cl.
  *B60T 8/1755* (2006.01)
  *B60W 10/04* (2006.01)
  *B60W 10/184* (2012.01)

(52) U.S. Cl.
  CPC .......... *B60W 10/04* (2013.01); *B60W 10/184* (2013.01); *B60T 2240/06* (2013.01); *B60T 2270/86* (2013.01); *B60W 2520/10* (2013.01); *B60W 2520/263* (2013.01); *B60W 2520/266* (2013.01); *B60W 2552/40* (2020.02)

(56) References Cited

U.S. PATENT DOCUMENTS

| | | | |
|---|---|---|---|
| 2009/0118905 A1 | 5/2009 | Takenaka et al. | |
| 2009/0319114 A1* | 12/2009 | Takenaka | B60W 10/04 701/48 |
| 2011/0035086 A1* | 2/2011 | Kim | G05D 1/0238 701/42 |
| 2017/0158225 A1* | 6/2017 | Brown | G05D 1/0255 |
| 2018/0037234 A1 | 2/2018 | Hoedt et al. | |
| 2018/0105158 A1* | 4/2018 | Namuduri | B60W 40/076 |
| 2019/0024781 A1 | 1/2019 | Chrungoo et al. | |
| 2020/0023852 A1* | 1/2020 | Yi | B60W 40/101 |
| 2020/0290596 A1* | 9/2020 | Birch | B60W 10/02 |

FOREIGN PATENT DOCUMENTS

| | | |
|---|---|---|
| EP | 1719676 A1 | 11/2006 |
| EP | 2927066 A1 | 10/2015 |
| GB | 2480852 A | 12/2011 |
| JP | H03128770 A | 5/1991 |
| JP | H04372451 A | 12/1992 |
| JP | H0511055 A | 1/1993 |
| JP | H05176580 A | 7/1993 |
| JP | H07117656 A | 5/1995 |
| JP | H10226347 A | 8/1998 |
| JP | H10264798 A | 10/1998 |
| JP | 2001018780 A | 1/2001 |
| JP | 2001334922 A | 12/2001 |
| JP | 2009083820 A | 4/2009 |
| JP | 2009214753 A | 9/2009 |
| JP | 2010276446 A | 12/2010 |
| JP | 2018205940 A | 12/2018 |
| JP | 2019519430 A | 7/2019 |
| JP | 2020530922 A | 10/2020 |
| KR | 19990041251 A | 6/1999 |
| KR | 20170035142 A | 3/2017 |
| WO | 2004067307 A1 | 8/2004 |
| WO | 2013087169 A1 | 6/2013 |
| WO | 2017215751 A1 | 12/2017 |
| WO | 2018143759 A1 | 8/2018 |
| WO | 2019032728 A1 | 2/2019 |

OTHER PUBLICATIONS

International Preliminary Report on Patentability dated Oct. 28, 2020 in corresponding International PCT Application No. PCT/EP2019/065739, 7 pages.
Japan Office Action dated Jun. 2, 2023 in corresponding Japan Patent Application No. 2021-572903, 21 pages.
Chinese Office Action dated Mar. 29, 2024 in corresponding Chinese Patent Application No. 201980097384.4, 14 pages.
Japanese Office Action dated Jan. 16, 2025 in corresponding Japanese Patent Application No. 2021-572903, 15 pages.
Chinese Office Action dated Oct. 8, 2024 in corresponding Chinese Patent Application No. 201980097384.4, 18 pages.

* cited by examiner

METHOD FOR VALIDATING A MODEL ASSOCIATED WITH VEHICLE DYNAMICS

CROSS-REFERENCE TO RELATED APPLICATIONS

This application is a U.S. National Stage application of PCT/EP2019/065739, filed Jun. 14, 2019, and published on Dec. 17, 2020, as WO 2020/249239 A1, all of which is hereby incorporated by reference in its entirety.

TECHNICAL FIELD

The present disclosure relates to methods, control units, and vehicles for validating models associated with vehicles, with parts of vehicles and/or with systems involving vehicles. The validated models find applications in, e.g., level 4 (L4) autonomous driving, and are particularly relevant when controlling a vehicle during an emergency maneuver to bring the vehicle into a safe state.

The invention can be applied in heavy-duty vehicles, such as trucks and construction equipment. Although the invention will be described mainly with respect to cargo transport vehicles such as semi-trailer vehicles and trucks, the invention is not restricted to this particular type of vehicle but may also be used in other types of vehicles such as cars.

BACKGROUND

Advanced vehicle motion control systems are being introduced to support, e.g., autonomous drive functionality and to improve vehicle safety. These vehicle control systems use models that describe how the vehicle, or a parts of the vehicle, is expected to behave in response to control signals for a given driving scenario. The models may be implicit, i.e., may describe general mathematical relationships between vehicle state variables and control inputs, or they may be explicit in that they provide direct algorithmic relationships between state variables and control inputs. The models may be simplified models or may include complex control functions comprised in, e.g., a vehicle motion management system.

It is important that the vehicle models are valid, i.e., that they represent vehicle behavior in an accurate way for the entirety of the operational design domain (ODD). Invalid models of, e.g., achievable lateral tyre force may cause an increased risk of accidents which cannot be tolerated.

For instance, an autonomous drive system (ADS) is often designed for ensuring (at least with high probability) that an accident risk during operation of the vehicle is at an acceptable level. Such 'assurances' can be achieved by making sure that used models are valid, by providing valid capabilities of model usage, and by limiting the operation of the vehicle to scenarios where it can be ascertained that the vehicle can avoid or mitigate accidents by executing some type of emergency maneuver. Knowing that an emergency maneuver can be carried out successfully with high probability in a given scenario is typically based on models of the vehicle dynamics during a transition to a safe state.

It is often desirable to maximize an ODD of a vehicle. However, to guarantee model validity, large safety margins are often required. These safety margins limit the vehicle ODD which is a drawback.

There is a need for improved methods for validating vehicle models.

SUMMARY

It is an object of the present disclosure to provide a method for validating a model associated with vehicle dynamics for use in autonomous driving. The method comprises setting a wheel slip limit on an operation of at least one vehicle torque device, obtaining the model associated with vehicle dynamics based on the set wheel slip limit, and validating the model of vehicle dynamics based on the set wheel slip limit.

The disclosed methods allow for using explicit models of vehicle dynamics to analyze the behavior of the vehicle during, e.g., an emergency maneuver. This is an advantage compared to models that are implicitly given by data since explicit models i) can be more easily analyzed by humans, and ii) allows for analyzing the behavior during an emergency maneuver using well-established formal methods from control theory. Consequently, the methods disclosed herein provide a more efficient usage of data when, e.g., the performance of an emergency maneuver is validated.

Another beneficial effect associated with the herein disclosed methods is that the capability of being able to generate lateral forces during, e.g., an emergency maneuver is maintained due to the set limits on wheel slip. This reduces the necessary model uncertainty margins and therefore increases the vehicle ODD, which is an advantage.

The at least one vehicle torque device may comprise at least one braking device and/or at least one propulsion device.

Thus, the method is quite versatile in that both braking devices and propulsion devices can be treated using the same framework. This improves vehicle control and permits model validation over a large range of different models, which is an advantage.

According to aspects, the method comprises setting a wheel slip control bandwidth requirement or rise time requirement on the operation of the at least one vehicle torque device. This means that unexpected sudden events causing slip outside of the set slip limits can be tolerated as long as they are suppressed quickly enough. This is an advantage since some limitations on the ODD of the vehicle can be removed. For instance, a vehicle may drive over a bump, whereby axle load temporarily is reduced causing temporary wheel slip. Also, a vehicle tyre may suddenly hit a spot or stretch of oil or ice, causing sudden slip which cannot be predicted. However, if the torque device is able to control wheel slip fast enough, the model validity may be assured despite the temporary wheel slip.

According to aspects, the wheel slip limit is configured in dependence of a road friction condition such as a road friction coefficient. This is an advantage since different road conditions can be accounted for. This improves the versatility of the method and also reduces necessary margins on, e.g., the ODD, due to the more refined setting of wheel slip limits.

According to aspects, the wheel slip limit comprises a range of acceptable wheel slip values and a tolerance value indicating a required wheel slip control precision. This allows for some freedom by the torque device to meet the set limits, which improves operation of the torque device.

According to aspects, the method comprises transmitting one or more model capabilities corresponding to the validated model of vehicle dynamics to a traffic situation management unit comprised in a higher layer of a control stack of the vehicle. Thus, the traffic situation management unit receives validated models which have been assured by the underlying functions, e.g., a vehicle motion management system associated with the vehicle. This is at least in part enabled by the set limits on wheel slip.

According to aspects, the model of vehicle dynamics is arranged to account for a tyre and/or torque device wear effect. Tyre and torque device wear may significantly affect vehicle models. Thus, by accounting for such effects the validated vehicle models become more refined and may potentially need smaller safety margins. This improves vehicle operation.

According to aspects, the model of vehicle dynamics is arranged to account for an axle load and/or an axle load distribution of the vehicle. The axle load and/or axle load distribution also has an effect on the models associated with the vehicle. For instance, cornering stiffness may depend on a normal force acting on vehicle tyres, which is determined as least partly from axle loads.

According to aspects, the method comprises authenticating the vehicle torque device to determine compliance with the wheel slip limit. This way it can be assured that the torque device to subject to the set wheel slip limits are actually compliant in the sense that the wheel slip is actually limited to the set values. This way vehicle safety is enhanced, since it becomes more difficult to use non-compliant devices with the vehicle.

There is also disclosed herein control units, computer programs, computer readable media, computer program products, and vehicles associated with the above discussed advantages.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

Figure 1:
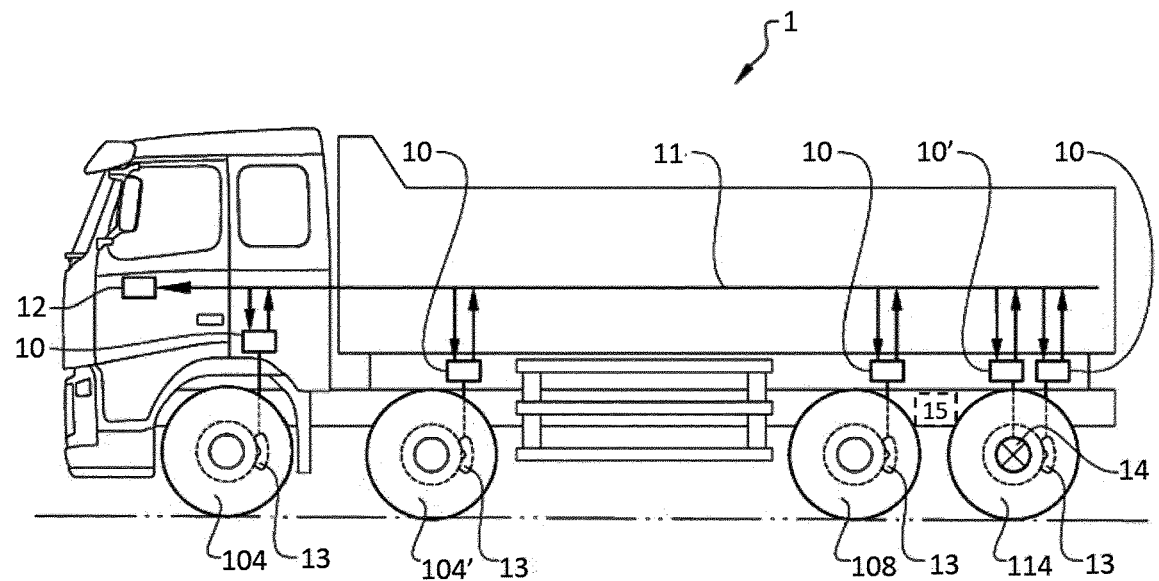
FIG. 1 schematically illustrates a vehicle for cargo transport.

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description.

It is to be understood that the present invention is not limited to the embodiments described herein and illustrated in the drawings; rather, the skilled person will recognize that many changes and modifications may be made within the scope of the appended claims.

With reference to FIG. 1, there is depicted a vehicle 1 in the form of a truck. The vehicle comprises a plurality of wheels 104, 104', 108, 114. Each of the wheels comprises a respective wheel brake 13. The wheel brakes 13 are here shown as disc brakes, but other types of brake arrangements such as drum brakes or regenerative brakes for charging vehicle batteries are also included in the scope of the present disclosure. In the embodiment depicted in FIG. 1, each of the wheels 104, 104', 108, 114 are provided with a wheel brake 13. It is, however, appreciated that one or more pairs of wheels may be arranged without such a wheel brake.

The vehicle 1 also comprises a wheel propulsion device 14 arranged to propel at least one wheel of the vehicle 1. In the embodiment depicted in FIG. 1, only the rearmost wheel is provided with a wheel propulsion device. However, each of the wheels, or a selected number of wheels, or no wheels at all, may be provided with a wheel propulsion device 14. The wheel propulsion device is preferably an electric motor powered from an electrical energy storage like an electrical battery 15.

Herein, wheel brakes and wheel propulsion devices are commonly referred to as wheel torque devices.

In the example of FIG. 1, each of the wheel brakes 13 is connected to corresponding decentralized wheel brake controllers 10 arranged for controlling operation of the respective wheel brake 13. Likewise, the wheel propulsion device 14 is connected to a decentralized wheel propulsion controller 10' arranged to control operation thereof. It is appreciated that the vehicle 1 may utilize a combined decentralized wheel brake and propulsion controller arrangement for vehicle motion control.

Each of the wheel brake controllers 10 and the wheel propulsion controller 10' are connected to a vehicle motion management (VMM) control unit 12 of the vehicle 1 via a data bus communication arrangement 11. Hereby, data can be transmitted between the VMM control unit 12 and the wheel brake controllers 10 and the wheel propulsion controller 10'.

Figure 2A:
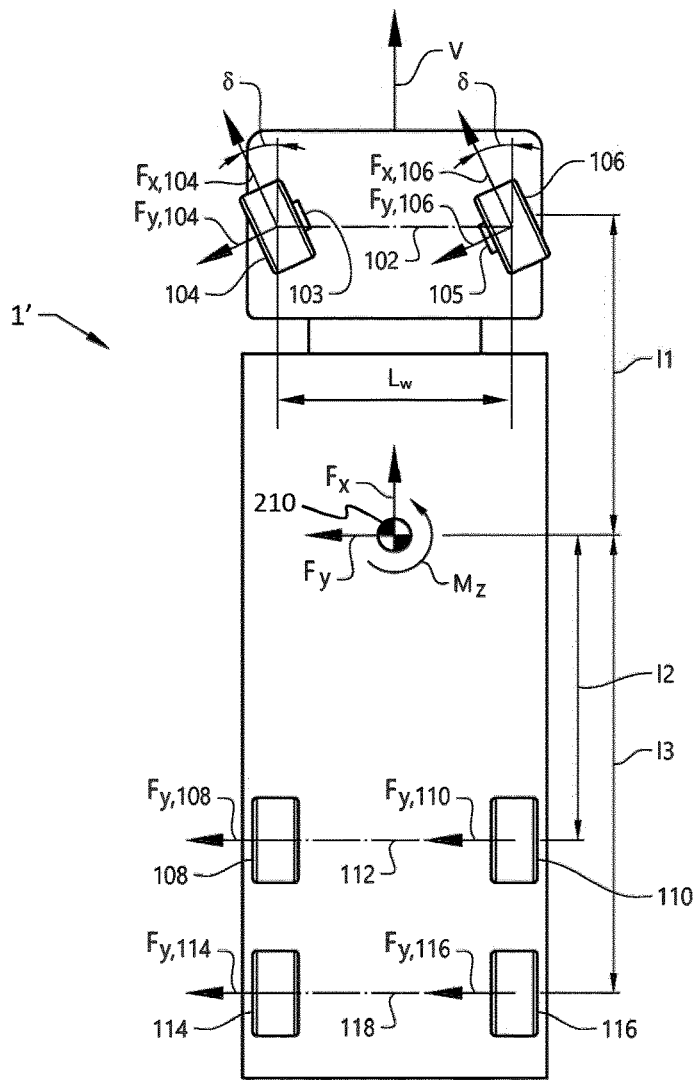
FIG. 2A-C show example forces acting on vehicles.

FIG. 2A illustrates some example forces acting on a vehicle 1' and its wheels 104, 105, 108, 110, 114, 116. Note that the vehicle 1' in FIG. 2A is a semi-trailer vehicle while the vehicle 1' in FIG. 1 is a rigid truck, just to exemplify the versatility in terms of vehicle type that the herein disclosed methods provide; The techniques disclosed herein are applicable to a wide variety of vehicle types, including both semi-trailer vehicles and trucks.

It is noted that slip control herein refers to slip control on any wheel of the vehicle and trailer combination, not just the wheels on a tractor unit.

The pair of steerable wheels 104, 106 in FIG. 2A is executing a turning maneuver and are therefore arranged at a steering angle δ with respect to a vehicle forward direction. The steering angle δ is for simplicity in FIG. 2A illustrated as the same for the left 104 steerable wheel and the right 106 steerable wheel and is an angle of the wheels relative to a longitudinal axis of the vehicle 1'. The vehicle 1' is operated at a vehicle speed indicated as V. The steerable wheels 104, 106 also comprise respective wheel torque actuators 103, 105.

The front axle 102 is arranged at a distance $l_1$ from a center of mass 210 of the vehicle 1', the first rear axle 112 is arranged at a distance $l_2$ from the center of mass 210 of the vehicle 1', and the second rear axle 118 is arranged at a distance $l_3$ from the center of mass 210 of the vehicle 1'. The center of mass 210 is a position of the vehicle 1' at which total global forces affecting the vehicle 1' can be expressed in a known manner.

In the following, the x-axis is extending in the longitudinal direction of the vehicle 1,1', the y-axis is extending in the transversal direction of the vehicle 1,1' and the z-axis is extending in the vertical direction of the vehicle 1,1'. During a turning maneuver, the vehicle 1' is exposed to a torque $M_z$ at the center of mass 210. Also, the vehicle is exposed to a global longitudinal force $F_x$ and a global lateral force $F_y$.

Moreover, when the steerable wheels 104, 106 of the front axle 102 is exposed to the steering angle $\delta$, the steerable wheel 104 on the left hand side is exposed to a longitudinal force $F_{x,104}$ and a lateral force $F_{y,104}$ while the steerable wheel 106 on the right hand side is exposed to a longitudinal force $F_{x,106}$ and a lateral force $F_{y,106}$.

The sum of the lateral forces of the steerable wheels 104, 106 on the left and right hand sides can be expressed as a total front wheel lateral force. The sum of the front wheel longitudinal forces may be increased and reduced when e.g. propelling the vehicle or braking the vehicle.

The first rear wheels 108, 110 are exposed to respective lateral forces $F_{y,108}$ and $F_{y,110}$ and the second rear wheels 114, 116 are exposed to respective lateral forces $F_{y,114}$ and $F_{y,116}$. In the example of FIG. 2A, the longitudinal forces of the pair of first rear wheels 108, 110 and the pair of second rear wheels 114, 116 is set to zero, i.e. the respective wheel is not exposed to any forces resulting from propulsion or braking.

Figure 2B:
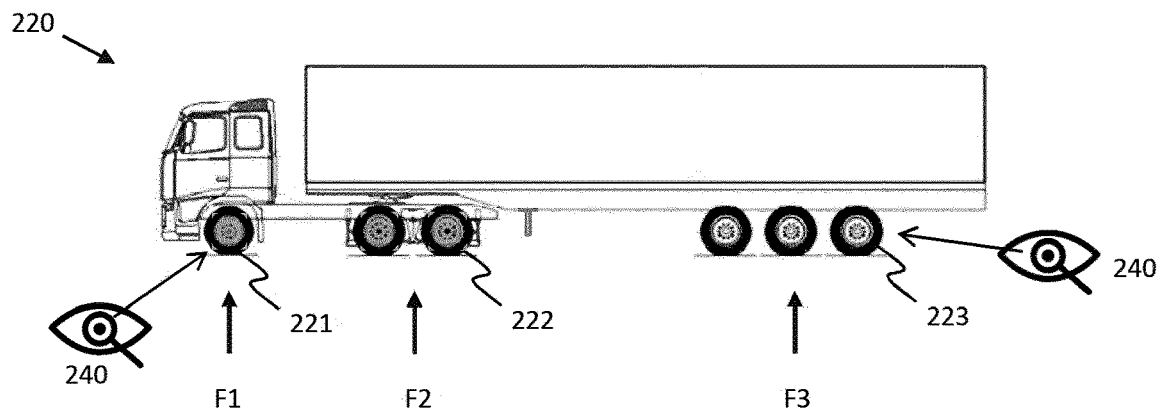
Figure 2C:
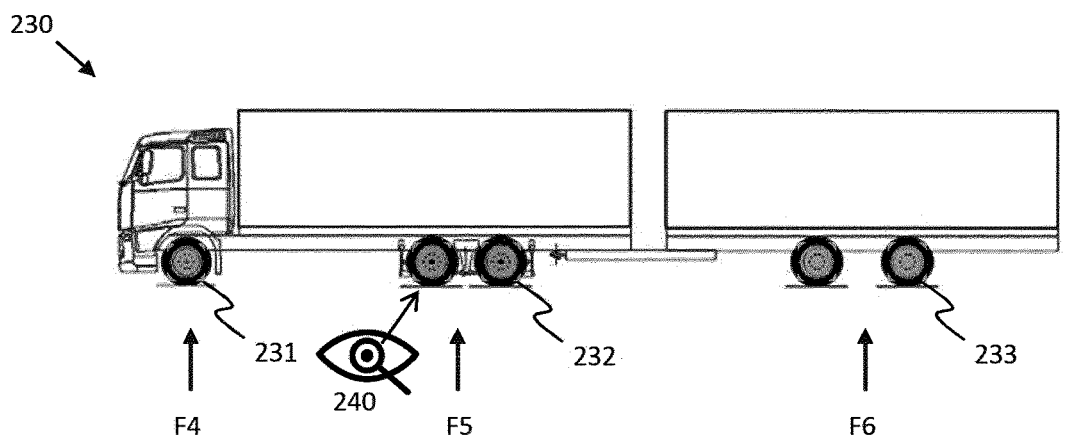

FIG. 2B illustrates an example vehicle combination 220 with axle loads F1, F2, and F3. The vehicle 200 is a tractor and semi-trailer combination vehicle having a gross combination weight (GCW) of about 40 tons. Reasonable values for the axle loads are then F1=7.0 tons, F2=12.1 tons, and F3=20.9 tons. FIG. 2C shows another example vehicle combination 230 with axle loads F4, F5, and F6. This combination also has a GCW of 40 tons, distributed as F4=7.0 tons, F5=16.0 tons, and F6=17.0 tons. The axle loads impact wheel slip as will be discussed in more detail below.

In case axle loads differ significantly from nominal values, then vehicle models comprising, e.g., cornering stiffness (discussed in more detail below) may not be valid anymore. Thus, according to aspects of the methods discussed herein, axle load is monitored, and vehicle model validity is established also based on the monitored axle loads. For instance, since axle load to a large extent determines the normal force $F_z$ acting on tyres, axle load also has an important impact on achievable lateral tyre force; $F_y \leq \mu F_z$, where $\mu$ is a friction coefficient associated with a road friction condition.

Friction limits may be incorporated in an ODD associated with a given vehicle. For instance, transport may never be conducted in low friction conditions, only during rain, such that the ODD requires, e.g., $\mu \leq 0.5$. Thus, by monitoring axle load for the different vehicle axles, and requiring it to be within a range of respective allowable axle loads, model validity can be determined.

FIGS. 2A and 2B also illustrate tyre inspection 240 to determine a tyre wear condition. Tyre wear may also have a significant impact on the behaviour of the vehicle. For instance, tyre wear has an impact on the cornering stiffness of a tyre.

An ADS needs to guarantee that accident risk is at a tolerable level with high integrity. This responsibility can be described as a safety system that would typically be implemented with high requirements on both availability and performance. The techniques disclosed herein involve placing requirements on brake systems and/or propulsion devices such as electrical motors in order to facilitate such a system. The present disclosure is at least partly based on the observation that, at any point in time, there is a connection between the maximal achievable lateral force $F_y$ and the maximal longitudinal force $F_x$ that a vehicle can achieve on, e.g., a tyre. This means that if a too high longitudinal brake force is applied, the lateral steering capability of the vehicle is lost. From a model perspective, this implies that there will be large uncertainties in the lateral dynamics of the vehicle if unrestricted braking is allowed. The large uncertainties lead to a conservative analysis of the performance of an emergency maneuver and thus a significantly reduced ODD of the ADS. The present disclosure aims to overcome this drawback by providing improved methods for model validation. These improved methods are at least in part all based on that limits on allowable wheel slip are imposed on wheel torque devices, such as brakes and propulsion arrangements.

Figure 3:
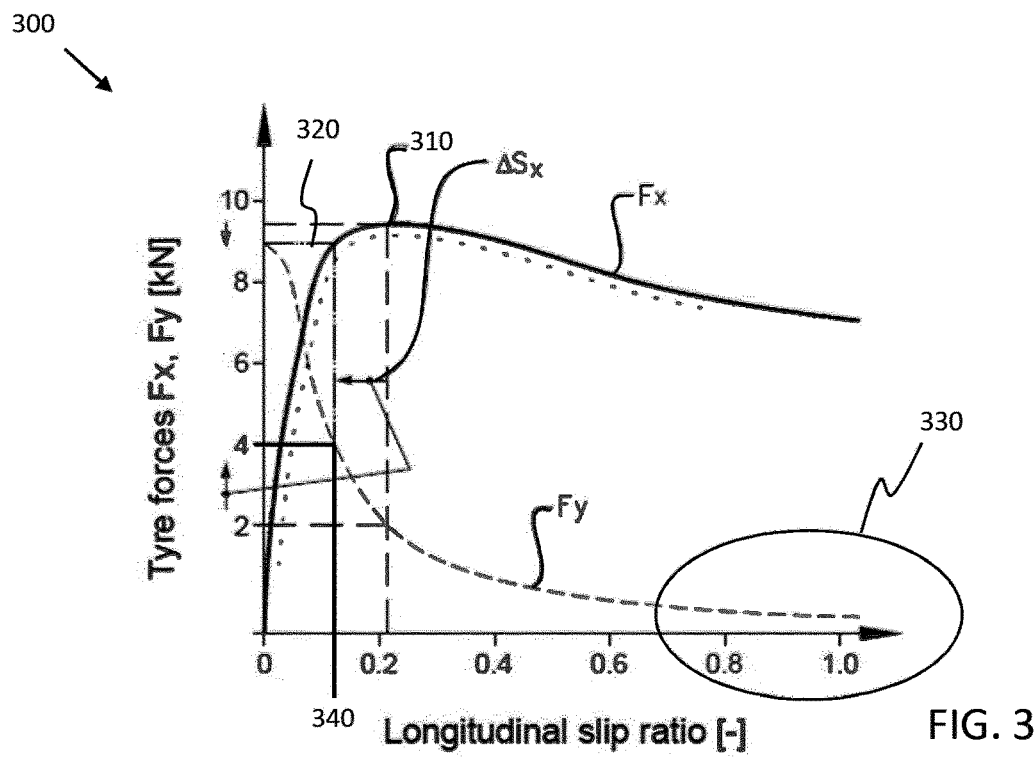
FIG. 3 is a graph showing a relationship between wheel slip and wheel forces.
Figure 4:
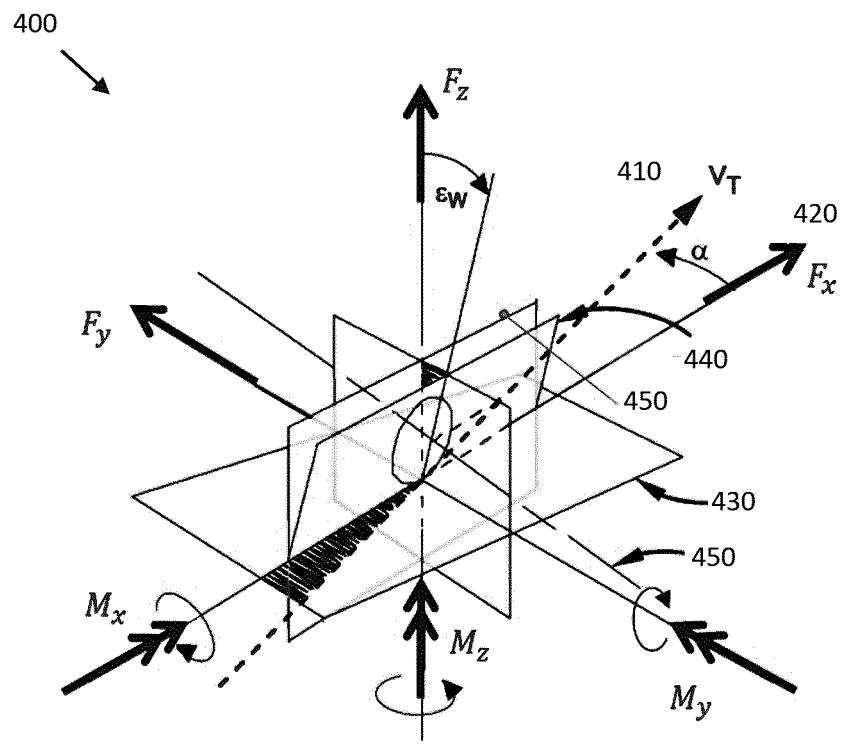
FIG. 4 schematically shows forces acting on a wheel.

Herein, the wording "longitudinal wheel slip" or "longitudinal tyre slip" should be understood to mean the relative longitudinal motion between the wheel of the vehicle and the ground surface thereof, i.e. the amount of "skidding". The "longitudinal wheel force" should be understood to mean a friction force (in the longitudinal direction) between the surface of the wheel and the road surface thereof. This friction force may be an estimated friction force, which is estimated based on e.g. an estimation model, such as a state observer which receives input relating to e.g. brake torque, brake pressure, wheel speed, etc. Some example forces acting on a tyre are schematically illustrated in FIG. 4 below. Longitudinal tyre slip, $s_x$, may according to some aspects be defined as $$s_x = \frac{R\omega - v_x}{|R\omega|}$$

where R denotes the radius of the tyre, $\omega$ denotes the angular velocity of the tyre and $v_x$ denotes the longitudinal speed of the tyre. A typical relationship 300 between the longitudinal tyre slip, the longitudinal tyre force and the maximum achievable lateral tyre force is exemplified in FIG. 3. Note that the capability of producing lateral tyre force is significantly reduced 330 if a too high longitudinal tyre slip is allowed. However, if the maximum allowable tyre slip is restricted to lie within a range 310, then the capability of producing lateral tyre force at all times is maintained. If the wheel slip is further restricted 320, then the capability of producing lateral tyre force is even less affected. Thus, it is essential that a braking or propulsion device that is used during, e.g., an emergency maneuver, can guarantee that the longitudinal tyre slip is limited such that enough lateral tyre force can be produced for the duration of the maneuver.

A measure of maximum allowable slip can be determined as follows. Suppose a vehicle is associated with some ODD: For example, there may be a limit on velocity $v_x$ and road curvature Q or some other type of limit on maneuvering by the vehicle. The maximum lateral acceleration $a_{y,max}$ can then be determined as $$a_{y,max} = \frac{v_{x,max}^2}{Q}$$

where $v_{x,max}$ is the speed limit. This lateral acceleration results in a lateral tyre force $F_y$ (depending on vehicle mass properties). This lateral tyre force can be used in, e.g., FIG. 3 to find a maximum allowable slip limit 340.

Some terminology related to a wheel, as well as models 400 of forces acting on a wheel are given in FIG. 4. The tyre (or wheel) is often described in its own coordinate system, as shown in FIG. 4. The vehicle travels in a direction 410 with some velocity $V_T$. However, the wheel is heading 420 in a slightly different direction 420. Thus, there is a slip angle α. Three forces and moments are acting on the wheel from the ground; A normal force $F_z$ extends in a direction perpendicular to the road plane 430. A longitudinal force $F_x$ extends along the wheel in the road plane 430, while a lateral force $F_y$ extends perpendicular to the wheel in the road plane 430. The wheel plane 440 has a camber angle $\varepsilon_W$ with respect to a normal plane 450 to the road plane 430. The wheel is also associated with a wheel spin axis 450.

Figure 5:
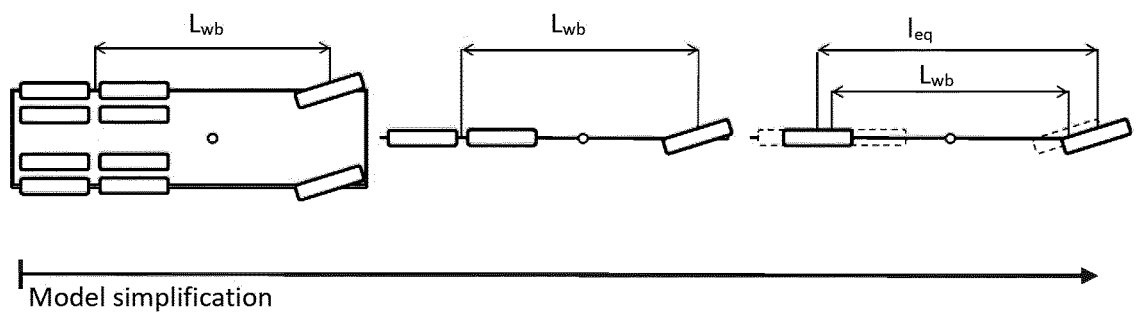
FIG. 5 illustrates vehicle models of varying complexity.

The so-called brush model is a vehicle model which is frequently used to explain how tyre develop forces in ground plane. The brush model is a physically based model that uses shear stress and dry friction at a local level, i.e. for each contact point in the contact patch. When studying, e.g., the vehicle cornering response, it is useful to combine the effects of all tyres on the axle into one virtual tyre. This assumption, referred to as the one-track model (or single-track model or bicycle model), facilitates understanding but can also capture important phenomena. Simplification into a one-track model is illustrated in FIG. 5A, where a two-track model of a vehicle 1 with multiple non-steering axles and dual tyres is first simplified into a one-track model with multiple axles but with single tyres, and then into a one-track model with an equivalent wheelbase and single tyres. The simplification of vehicle dynamical models into a single track model is well known and will not be discussed herein in more detail.

Lateral wheel slip, $s_{yw}$, can be defined as $$s_{yw} = \frac{v_y}{v_x}$$

where $v_y$ and $v_x$ denote lateral and longitudinal velocity respectively. The lateral tyre slip, $s_{yt}$, can be defined as $$s_{yt} = \frac{v_y}{|R\,\omega|}$$

where $v_y$ denotes the tyre translational velocity. If there is no longitudinal slip, then $v_x = R\,\omega$ and $s_{yt} = s_{yw}$. The wheel slip angle, α, see FIG. 4, can be defined as $s_{yw} = \tan α$ small lateral tyre slips, the lateral tyre force, $F_y$, may be modelled as For small lateral tyre slips, the lateral tyre force, $F_y$, may be modelled as $$F_y = -C_y s_{yt}$$

where $C_y$ is a constant. This constant is sometimes referred to as cornering stiffness and depends on, e.g., wheel slip and on the normal force $F_z$, discussed above in connection to FIGS. 2B and 2C. The lateral force $F_y$ can never exceed $F_z*\mu$, where μ is a friction coefficient. The axle load on the drive axle or drive axles is especially important when it comes to determining how the vehicle can be accelerated. Low axle load on the drive axle often means that the wheels slip more easily.

The cornering stiffness of a vehicle is an example of a vehicle model which can be validated by setting limits on wheel slip. This is at least partly because models of cornering stiffness change substantially when the wheel enters a severe slip condition, while more simple models can be assumed valid for low slip values, i.e., for small lateral tyre slips. It is also noted that, by imposing a limit on allowable wheel slip, simplified models of vehicle properties valid for small wheel slip can be used.

According to some aspects, the axle load of the vehicle is also monitored and used to validate models associated with the vehicle. For instance, a check on axle loads may be performed prior to starting the vehicle, and if the axle loads are not within configured limits then the vehicle may not be permitted to operate or may be associated with a reduced ODD to account for the axle load distribution. Thus, vehicle models are validated by assuming axle loads are within a range where the vehicle models are accurate enough.

Tyre wear may also impact vehicle properties like cornering stiffness. With reference to FIGS. 2B and 2C; Vehicle tyres 221, 222, 223, 231, 232, and 233, can be inspected 240 regularly for wear, and the wear level of each tyre can be used to refine the models associated with the corresponding vehicles. For instance, cornering stiffness often depends on tyre wear. In fact, a worn-out tyre may be associated with up to 60% more cornering stiffness compared to a new tyre.

Combining the relations discussed above with the assumption that $s_x$ is not equal to zero but small, gives $$F_y = -C_y(1-s_x)\tan α$$

This means that the sensitivity of $F_y$ with respect to α is given by $$\frac{\partial F_y}{\partial α} = -C_y(1-s_x)(1+\tan^2 α)$$

Hence, by limiting e.g. $|s_x| \leq 0.15$ the lateral capabilities are affected by maximum 15% by the longitudinal tyre slip during braking. Thus, by setting limits to allowable wheel slip, simplified single track models can be used to model vehicle dynamics. Furthermore, these models can be validated as sufficiently accurate over the ODD as long as the wheel slip is kept within some pre-determined limits.

Figure 6:
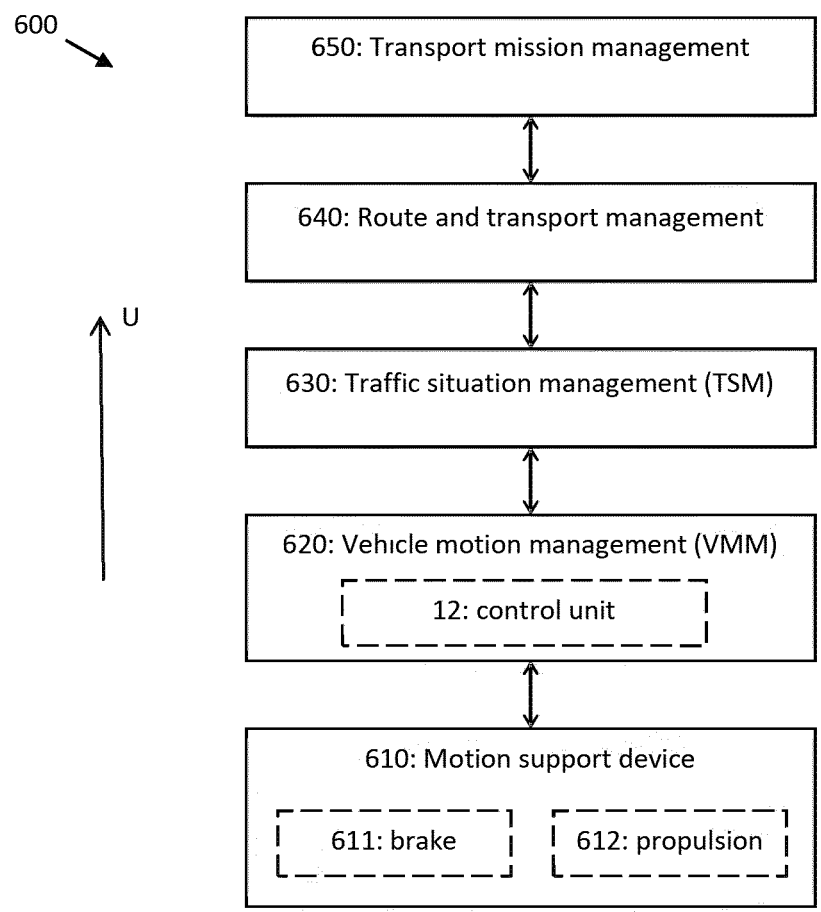
FIGS. 6-7 illustrate example vehicle control systems.

FIG. 6. shows an example vehicle control stack comprising one or more motion support devices 610, i.e., braking devices 611 and/or propulsion device 612. The motion support device 610 is communicatively coupled to a VMM device 620 which may comprise the control unit 12 discussed above. The VMM unit 620 may be arranged to transmit torque requests and wheel slip limits to the motion support device 610. By transmitting the wheel slip limits, vehicle dynamics modelling is significantly simplified, as discussed above.

To summarize, the VMM 620 sets or otherwise requires a wheel slip limit on an operation of at least one motion support device 610, such as a torque device 13, 14. The VMM then obtains a model of vehicle dynamics based on the set wheel slip limit, and validates the model of vehicle dynamics based on the set wheel slip limit. Thus, setting a wheel slip limit, and then trusting the motion support device 610 to abide by the set wheel slip limit, enables model validation in a previously unknown manner.

The VMM unit 620 is, according to some aspects, also arranged to send model capabilities for the validated model upwards, in direction U, in the vehicle control stack 600 to, e.g., a traffic situation management (TSM) unit 630. The TSM unit 630 is in communication with a route and transport management unit 640 which then communicates with a transport mission management unit 650. These functions provide higher layer features which are not in scope of the present disclosure and will therefore not be discussed in more detail herein.

The validity and capability of the used models in TSM and upwards in the vehicle control stack 600 are guaranteed, i.e., validated, by the VMM 620. This validation is enabled by requesting and writing a contract with motion support device suppliers of, e.g., service brakes and electric motor torque devices to guarantee an accurate slip control within a certain bandwidth. E.g. a maximum slip limit of −0.15 with a tolerance value of +/−0.02.

The VMM may also impose requirements on the control bandwidth of the motion support devices 610. The bandwidth or rise-time is important since wheel slip may suddenly go above set limits due to various reasons, which cannot be prevented. For instance, the vehicle may drive over a bump or a patch of ice, which the controller cannot predict in advance. The bandwidth requirement is a requirement on how fast the controller responds to these unexpected events to bring the slip back down to within the set limits again.

To ensure that a given motion support device is actually able to support the requested wheel slip limit, an authentication procedure may be implemented which comprises transmitting a challenge message to the motion support device 610, which then is expected to response with a verifiable response or key. In case the motion support device has been previously verified to be compliant with the imposed requirements on, e.g., wheel slip, it is provided with a response mechanism that generates a pre-determined response which can be sent back to the VMM as response to the challenge. This way the VMM can ensure that the motion support device is compliant with the imposed requirements on wheel slip and the like. Other known authentication mechanisms can of course also be used. In other words, there are disclosed herein methods for authenticating the vehicle torque device to determine compliance with the wheel slip limit.

Figure 7:
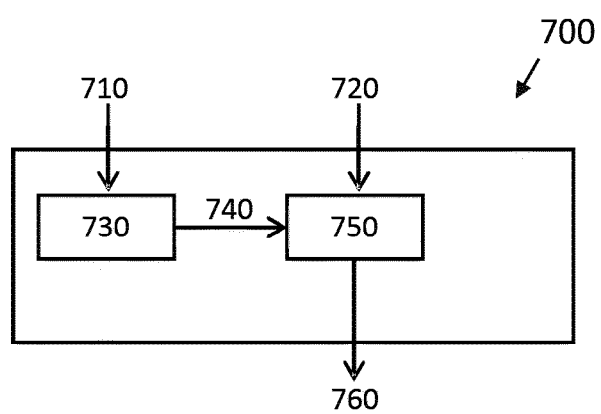

FIG. 7 shows an example motion support device 700 in more detail. This motion support device is, e.g., a braking device arranged to receive a torque request 710 and a wheel slip limit value 720. The example motion support device 700 comprises a wheel slip control module 730 arranged to calculate a longitudinal wheel slip value for the wheel slip between the surface of a corresponding wheel and the road surface. The wheel slip control module 730 is arranged to receive a maximum allowable wheel slip limit 710 for the wheel from, e.g., the VMM 620, which value may be received from the vehicle motion management controller 620 control unit 12. The wheel slip control module 730 thereafter calculates/determines a required brake pressure or brake torque value 740 required to bring the wheel to a longitudinal slip value which corresponds to the wheel slip limit value 710.

A brake torque demand module 750 is arranged to receive the required brake torque value 740 calculated by the wheel slip control module 730, and a desired brake torque demand 720 from an operator of the vehicle received, e.g., from the vehicle motion management controller 620. The brake torque demand module 750 then determines a brake torque demand value 760 by using, e.g., a minimum value of the required brake torque 740 and the desired brake torque demand value 720 from the operator. Hence, if the desired brake torque demand from the operator exceeds the required brake torque, then the brake torque demand module chooses/uses the required brake torque which is the minimum of these values. Hereby, the wheel slip is prevented from exceeding the wheel slip limit 710 imposed by, e.g., the VMM control unit 12.

An example of a wheel torque device control unit with associated control methods is described in WO 2017/215751 A1 and will therefore not be described in more detail herein.

Figure 8:
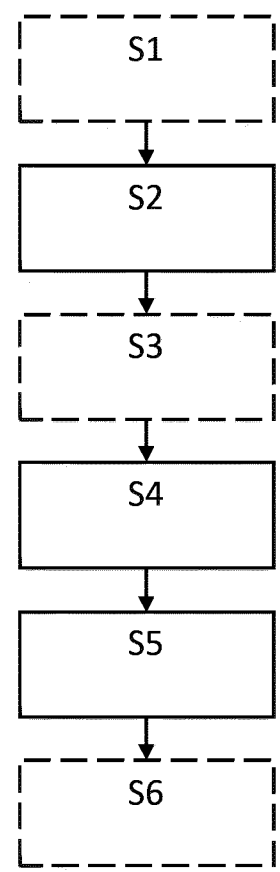
FIG. 8 is a flow chart illustrating methods.

FIG. 8 is a flow chart illustrating methods summarizing the above discussions. There is shown a method for validating a model associated with vehicle dynamics for use in autonomous driving. The method comprises setting S2 a wheel slip limit on an operation of at least one vehicle torque device. The setting of wheel slip limits was discussed above in connection to FIG. 3. A vehicle torque device was exemplified and discussed in connection to FIG. 7. The method also comprises obtaining S4 a model of vehicle dynamics based on the set wheel slip limit. This model of vehicle dynamics may, e.g., be obtained based on one of the modelling principles discussed in connection to FIG. 5 above, i.e., it could be a single track model. The model can also comprise cornering stiffness. The method comprises validating S5 the model of vehicle dynamics based on the set wheel slip limit. This validation is enabled by the imposed wheel slip limits, since explicit models can be formed based on the assumption that wheel slip above some set limit will not occur or will rarely occur. According to some aspects, simplified models of the vehicle dynamics, or of the properties of parts of the vehicle, can be used since wheel slip is limited to ranges where these simplified models are valid.

As discussed above, the at least one vehicle torque device may comprise a braking device 104 such as a disc brake, drum, brake, or regenerative brake. The at least one torque device may also comprise a propulsion device such as an electric motor or the like.

According to some aspects, the setting of the wheel slip limit may comprise setting S3 a wheel slip control bandwidth or maximum rise time value on the control operation of the at least one vehicle torque device. This control bandwidth or rise time may be important in order to assure a sufficiently fast wheel torque control which does not show lags that are difficult to predict and to model, as discussed above. This way, vehicle ODD margins can be reduced in some cases since it is known that the torque devices are able to respond fast to changes in driving conditions, such as a sudden onset of a slippery road condition or the like.

According to some aspects, the wheel slip limit comprises a limit on a longitudinal tyre slip, $s_x$, given by $$s_x = \frac{R\omega - v_x}{|R\omega|},$$

where R denotes a radius of a wheel tyre, $\omega$ denotes an angular velocity of the wheel tyre and $v_x$ denotes a longitudinal speed of the tyre. Other definitions of longitudinal tyre slip are of course possible. It is, however, appreciated that the methods and techniques disclosed herein are conceptual and therefore applicable for different definitions of tyre slip.

The wheel slip limit may optionally comprises a limit on a lateral tyre slip, $s_{yt}$, given by $$s_{yt} = \frac{v_y}{|R\,\omega|},$$

where $v_y$ denotes a tyre translational velocity, R denotes a radius of a wheel tyre, and $\omega$ denotes an angular velocity of the wheel tyre.

Road friction is known to impact tyre slip. The method may thus comprise configuring wheel slip limit in dependence of a road friction condition. This was discussed above in connection with FIG. 3.

According to some aspects, the wheel slip limit comprises a range of acceptable wheel slip values and a tolerance value indicating a required wheel slip control precision. The tolerance value sets requirements on, e.g., the motion support device 610, by requiring it to provide an operation with sufficient accuracy in order to meet the tolerance requirements.

According to some aspects, the model of vehicle dynamics comprises a lateral steering capability as discussed above. This means that a higher layer control unit can be assured that a given level of lateral steering can be expected from the vehicle.

According to some other aspects, the model of vehicle dynamics models a lateral tyre force $F_y$ acting on the vehicle, such as the expression $F_y=-C_y(1-s_x)\tan\alpha$ discussed above.

According to some other aspects, the model of vehicle dynamics comprises a cornering stiffness value associated with the vehicle. When assuming only small slip, it does not matter if the cornering stiffness is defined as the slope in an $F_y$ versus $\alpha$ diagram or versus a $\tan\alpha$ diagram. Therefore, the notation for cornering stiffness in the literature varies between $C_\alpha$ and $C_y$.

As discussed in connection to FIG. 6, the method may also comprise transmitting S6 one or more model capabilities corresponding to the validated model of vehicle dynamics to a traffic situation management unit.

According to aspects, the model of vehicle dynamics is an explicit model of vehicle dynamics. As noted above, the disclosed methods allow for using explicit models of vehicle dynamics to analyze the behavior of the vehicle during, e.g., an emergency maneuver. This is an advantage compared to models that are implicitly given by data since explicit models i) can be more easily analyzed by humans, and ii) allows for analyzing the behavior during an emergency maneuver using well-established formal methods from control theory.

According to aspects, the model of vehicle dynamics is arranged to account for a tyre and/or torque device wear effect.

According to aspects, the method also comprises authenticating S1 the vehicle torque device to determine compliance with the wheel slip limit.

Figure 9:
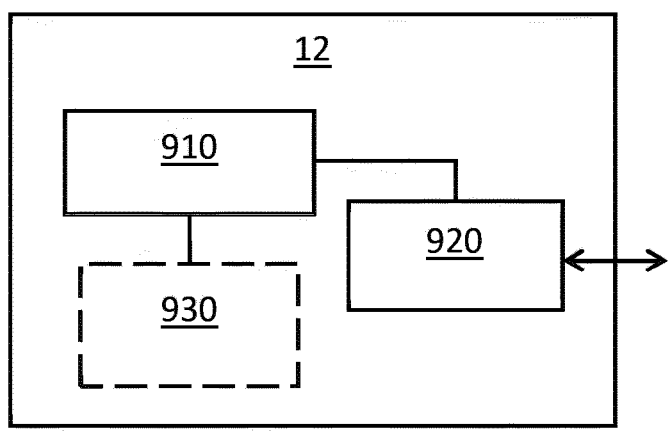
FIG. 9 schematically illustrates a control unit.

FIG. 9 schematically illustrates, in terms of a number of functional units, the components of a control unit 12 according to embodiments of the discussions herein. This control unit 12 may be comprised in the vehicle 1, 1'. Processing circuitry 910 is provided using any combination of one or more of a suitable central processing unit CPU, multiprocessor, microcontroller, digital signal processor DSP, etc., capable of executing software instructions stored in a computer program product, e.g. in the form of a storage medium 930. The processing circuitry 910 may further be provided as at least one application specific integrated circuit ASIC, or field programmable gate array FPGA.

Particularly, the processing circuitry 910 is configured to cause the control unit 12 to perform a set of operations, or steps, such as the methods discussed in connection to FIG. 8. For example, the storage medium 930 may store the set of operations, and the processing circuitry 910 may be configured to retrieve the set of operations from the storage medium 930 to cause the control unit 12 to perform the set of operations. The set of operations may be provided as a set of executable instructions. Thus, the processing circuitry 910 is thereby arranged to execute methods as herein disclosed.

The storage medium 930 may also comprise persistent storage, which, for example, can be any single one or combination of magnetic memory, optical memory, solid state memory or even remotely mounted memory.

The control unit 12 may further comprise an interface 920 for communications with at least one external device. As such the interface 920 may comprise one or more transmitters and receivers, comprising analogue and digital components and a suitable number of ports for wireline or wireless communication.

The processing circuitry 910 controls the general operation of the control unit 12, e.g., by sending data and control signals to the interface 920 and the storage medium 930, by receiving data and reports from the interface 920, and by retrieving data and instructions from the storage medium 930. Other components, as well as the related functionality, of the control node are omitted in order not to obscure the concepts presented herein.

Figure 10:
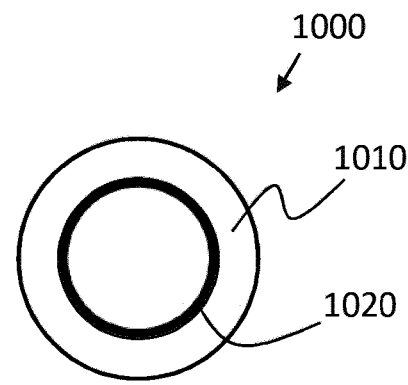
FIG. 10 shows an example computer program product.

FIG. 10 illustrates a computer readable medium 1010 carrying a computer program comprising program code means 1020 for performing the methods illustrated in FIG. 8, when said program product is run on a computer. The computer readable medium and the code means may together form a computer program product 1000.

The invention claimed is:

1. A computer implemented method for validating a model of vehicle dynamics for use in autonomous driving, the method comprising:
   determining a maximum wheel slip limit;
   setting a wheel slip limit on an operation of at least one vehicle torque device based on the maximum wheel slip limit;
   obtaining a model associated with vehicle dynamics, the model of vehicle dynamics being a model representing a relationship between a lateral tire force acting on a vehicle and a wheel slip value, with the wheel slip value being restricted within the wheel slip limit;
   validating the model of vehicle dynamics based on the set wheel slip limit; and controlling the at least one vehicle torque device based on the set wheel slip limit, wherein the wheel slip limit comprises a limit on a longitudinal tire slip, $s_x$, given by $s_x=$ $$\frac{R\omega - v_x}{|R\omega|},$$

where R denotes a radius of a wheel tire, $\omega$ denotes an angular velocity of the wheel tire and $v_x$ denotes a longitudinal speed of the tire, wherein the wheel slip limit comprises a limit on a lateral tire slip, $S_{yt}$, given by where $v_y$ denotes a tire translational velocity, R denotes a radius of a wheel tire, and ω denotes an angular velocity of the wheel tire.

2. The method according to claim 1, wherein the at least one vehicle torque device comprises a braking device.

3. The method according to claim 1, wherein the at least one vehicle torque device comprises a propulsion device.

4. The method according to claim 1, comprising setting a wheel slip control bandwidth requirement or rise time requirement on the operation of the at least one vehicle torque device.

5. The method according to claim 1, wherein the wheel slip limit is configured in dependence of a road friction condition or a road friction coefficient μ.

6. The method according to claim 1, wherein the wheel slip limit comprises a range of acceptable wheel slip values and a tolerance value indicating a required wheel slip control precision.

7. The method according to claim 1, wherein the model of vehicle dynamics comprises a lateral steering capability.

8. The method according to claim 1, wherein the model of vehicle dynamics models a lateral tire force $F_y$ acting on the vehicle.

9. The method according to claim 1, wherein the model of vehicle dynamics comprises a cornering stiffness value associated with the vehicle.

10. The method according to claim 1, comprising transmitting one or more model capabilities corresponding to the validated model of vehicle traffic situation management unit.

11. The method according to claim 1, wherein the model of vehicle dynamics is an explicit model of vehicle dynamics.

12. The method according to claim 1, wherein the model of vehicle dynamics is arranged to account for a tire and/or torque device wear effect.

13. The method according to claim 1, wherein the model of vehicle dynamics is arranged to account for an axle load and/or an axle load distribution of the vehicle.

14. The method according to claim 1, comprising authenticating the vehicle torque device to determine compliance with the wheel slip limit.

15. A non-transitory computer readable medium carrying a computer program comprising program code for performing the steps of claim 1 when said program code is run on a computer or on processing circuitry of a control unit.

16. The control unit arranged to validate a model of vehicle dynamics for use in autonomous driving, the control unit being configured to perform the steps of the method according to claim 1.

17. The vehicle comprising the control unit according to claim 16.

* * * * *